United States Patent
Duncan, Jr.

(10) Patent No.: US 6,726,084 B2
(45) Date of Patent: Apr. 27, 2004

(54) FRICTION STIR HEATING/WELDING WITH PIN TOOL HAVING ROUGH DISTAL REGION

(75) Inventor: Frank Gordon Duncan, Jr., St. Tammany Parish, LA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/882,612

(22) Filed: Jun. 15, 2001

(65) Prior Publication Data

US 2002/0190100 A1 Dec. 19, 2002

(51) Int. Cl.⁷ .......................... B23K 31/02; B23K 20/12
(52) U.S. Cl. ...................... 228/112.1; 228/2.1
(58) Field of Search ........................ 228/112.1, 114.5, 228/2.1, 5.5

(56) References Cited

U.S. PATENT DOCUMENTS

| | | | |
|---|---|---|---|
| 5,460,317 A | * | 10/1995 | Thomas et al. ........... 228/112.1 |
| 5,697,544 A | * | 12/1997 | Wykes ........................ 156/580 |
| 5,718,366 A | * | 2/1998 | Colligan ..................... 156/580 |
| 5,893,507 A | * | 4/1999 | Ding et al. .................. 228/2.1 |
| 5,971,247 A | * | 10/1999 | Gentry ........................ 156/580 |
| 6,029,879 A | * | 2/2000 | Cocks .......................... 228/2.1 |
| 6,036,491 A | * | 3/2000 | Hansson ..................... 156/580 |
| 6,053,391 A | * | 4/2000 | Heideman et al. ....... 228/112.1 |
| 6,171,224 B1 | * | 1/2001 | Phillips ..................... 428/34.4 |
| 6,206,268 B1 | * | 3/2001 | Mahoney .................. 228/112.1 |
| 6,227,430 B1 | * | 5/2001 | Rosen et al. ................ 156/73.5 |
| 6,299,050 B1 | * | 10/2001 | Okamura et al. ......... 228/112.1 |
| 6,302,315 B1 | * | 10/2001 | Thompson ............... 228/112.1 |
| 6,352,193 B1 | * | 3/2002 | Bellino et al. ........... 228/112.1 |
| 2002/0011509 A1 | * | 1/2002 | Nelson et al. ........... 228/112.1 |
| 2002/0011510 A1 | * | 1/2002 | Enomoto .................. 228/112.1 |
| 2002/0014516 A1 | * | 2/2002 | Nelson et al. ............. 428/34.4 |

FOREIGN PATENT DOCUMENTS

| | | | |
|---|---|---|---|
| GB | 2306366 A | * | 5/1997 |
| WO | WO 99/52669 A1 | * | 10/1999 |
| WO | WO 01/85385 A1 | * | 11/2001 |

OTHER PUBLICATIONS

Diamond Superabrasive Products□□Sharpex web site http://www.sharpex.com/prode.htm accessed Nov. 20, 2002.*

* cited by examiner

*Primary Examiner*—L. Edmondson
(74) *Attorney, Agent, or Firm*—Duane Morris LLP

(57) ABSTRACT

A stir friction pin tool has at least a portion of its distal end or tip which is either more rough than the cylindrical portion of the pin tool, or which has a surface roughness greater than 128 μ" regardless of the roughness of the cylindrical portion. The pin tool may include machined holes or slots, or may have an etched tip surface. The roughness aids in generating heat during the plunging portion of a stir friction welding or heating operation, to thereby reduce the overall time required for the operation.

6 Claims, 7 Drawing Sheets

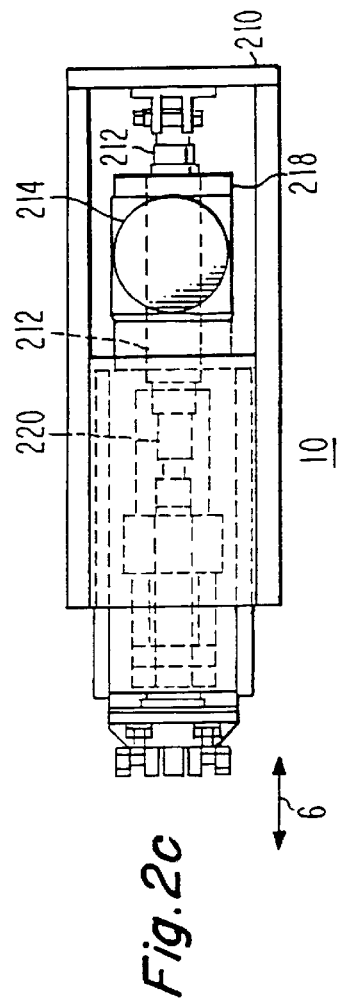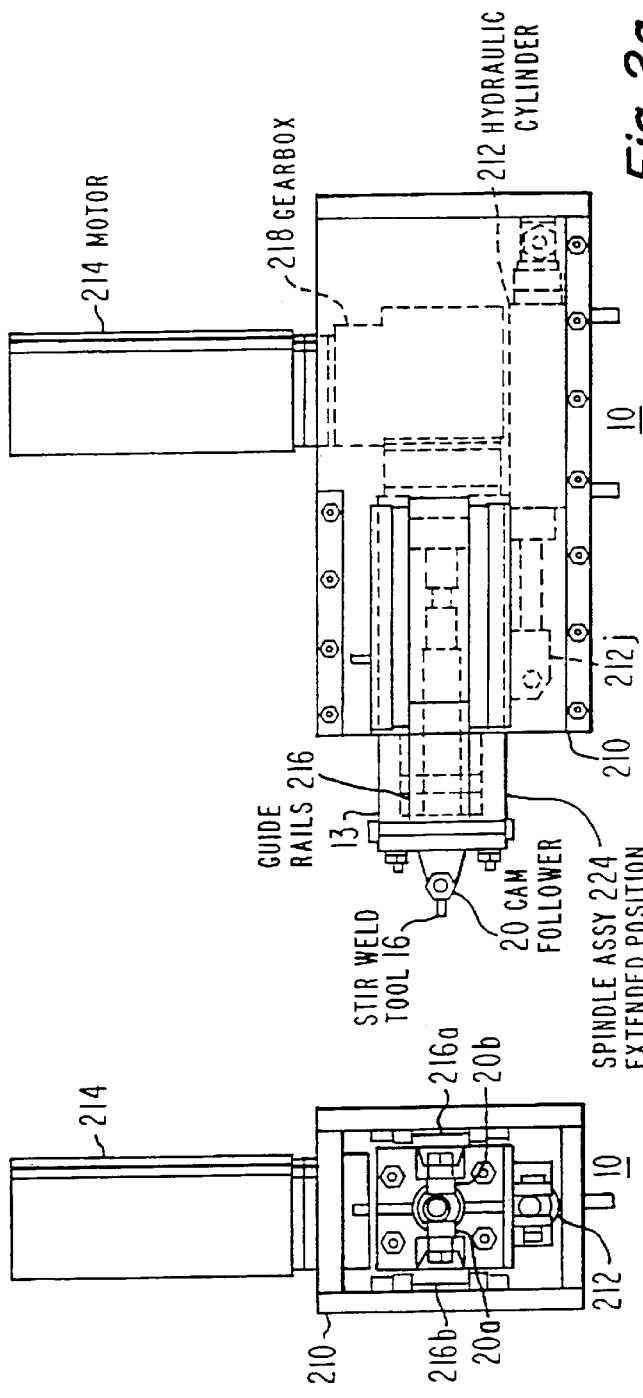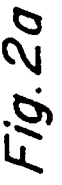

FRICTION STIR HEATING/WELDING WITH PIN TOOL HAVING ROUGH DISTAL REGION

FIELD OF THE INVENTION

This invention relates to friction stir heating and welding, and more especially to particular surface contours of the pin tool for generating heat.

BACKGROUND OF THE INVENTION

Stir friction heating or welding is a relatively new technique, which involves plunging a moving nonconsumable tool into solid material to be heated or welded, as described in U.S. Pat. No. 5,460,17, issued Oct. 24, 1995 in the name of Thomas et al. Friction stir welding has shown great promise for the welding of metals which are otherwise difficult to weld. In friction stir welding, the moving tool plasticizes portions of the workpiece immediately adjacent to the moving tool. An advantage of the stir-friction heating or welding technique is that the material which is heated is not exposed to combustion products, which tends to avoid chemical changes of the workpiece attributable to interactions with the fuel and its combustion products. Another advantage is that the heated portions of the material tend to coalesce and solidify immediately upon removal of the tool. Also, the temperature of the workpiece, even in the heated region, tends not to be so high as that which may occur during conventional welding, which in turn tends to reduce oxidation of the workpiece due to ambient atmosphere. This reduced tendency toward oxidation, in turn, reduces the need for an inert atmosphere surrounding the region being heated or welded. In some materials, such as aluminum-lithium alloys, conventional welding also causes undesirable grain growth of the crystal structure that lowers the strength of the material.

In the particular case of butt-welding of metal plates along juxtaposed sides to form a seam, the moving tool advantageously takes the form of a rotating "pin" tool extending into the region between the plates. The pin tool ordinarily used for welding is made from a material having a higher melting temperature than the material of the workpiece, and should be harder than the workpiece material in order to prevent pin deformation during the initial phases of plunging into the workpiece. The ordinary pin tool takes the form of a generally cylindrical body defining a proximal end and a distal end. The proximal end of the pin tool is shaped to be attached to a rotating spindle, and the distal end is rounded. The plates of the workpiece are desirably restrained from moving away from each other and from the moving pin tool as described in the Thomas et al patent, but are not necessarily pressed together. Relative motion between the rotating tool and the joint to be welded into a seam is provided, as by moving the workpieces so that the rotating pin tool follows or tracks the joint.

The weld is started by controlling the spindle relative to the workpiece(s) so that the distal end of the pin tool is pressed against the two halves of the joint and rotated. The rotation produces friction, which plasticizes the workpiece material immediately adjacent the pin tool, thereby allowing the tool to plunge further into the joint region. When the proper plunge depth has been reached, the pressure tending to push the pin tool into the joint is reduced or eliminated, while the rotation of the tool continues. The plunging force is often reduced by the presence of a shoulder on the pin tool which contacts the upper surface of the workpiece when the plunge has reached the proper depth. U.S. Pat. No. 5,971,247, issued Oct. 26, 1999 in the name of Gentry, describes a technique for using rollers associated with the spindle and bearing on the workpiece to reduce the plunging effect at the proper depth. Once the appropriate plunge depth is reached, however controlled, the workpiece is translated relative to the rotating pin tool, so as to progressively apply the rotating tool to the remaining portions of the region to be welded. The shoulder on the pin tool serves the additional purpose of polishing the welded region as the pin tool leaves a just-formed welded joint.

It has been discovered that production of a high-quality welded joint requires that the pin tool penetrate to a precise depth. U.S. Pat. No. 6,168,066 B1, issued Jan. 2, 2001 in the name of Arbegast, describes a controller for controlling the plunge depth of a pin tool in response to the electrical characteristics of the weld. Other control techniques can be used to control the penetration depth.

U.S. Pat. No. 6,053,391, issued Apr. 25, 2000 in the name of Heideman et al. describes a problem with the stir friction welding of lap joints, in which the melt is stirred from top to bottom by a pin tool surface profile consistent with the threads of a bolt. The problem is that the material of the welded joint is deformed in a direction which depends upon the direction of rotation of the pin tool. The problem is solved by a radially projecting boss(es) defined by counter-wound grooves, which tend to stir the melt in both upward and downward directions, and by a recessed shoulder region.

Improved stir friction welding devices and techniques are desired.

SUMMARY OF THE INVENTION

A method for stir friction welding according to an aspect of the invention includes the step of procuring a stir friction pin tool having the general form of an elongated cylindrical body defining a distal end. The pin tool has a predetermined surface roughness about the cylindrical body, and a greater surface roughness at the distal end. According to the method, the pin is rotated about the axis of its cylindrical body, while plunging the distal end of the pin tool into a workpiece for friction welding thereof. The pin tool is translated transversely along the workpiece without significant further plunging to continue the stir friction welding of the workpiece. In one mode of the method, at least a portion of the tip of the distal end of the pin tool has a surface roughness of at least 128 microinches.

According to another aspect of the invention, the tip region of the pin tool has a surface roughness equal to or greater than 128 RMS or the equivalent. The surface roughness can be achieved by methods including the slotting of the tip, or drilling holes into the tip, or possibly by welding or sputtering an appropriate material onto the tip.

According to another aspect of the invention, a stir friction welding apparatus includes a stir friction pin tool defining a cylindrical body, a distal end and a proximal end. The pin tool has a given surface roughness about the periphery of the cylindrical body, some means for attachment adjacent the proximal end, and a surface roughness on the distal end which is greater than the given surface roughness. The welding apparatus further includes a spindle defining an axis and adapted for rotation thereabout. The spindle is also adapted for relative axial and transverse motion relative to a workpiece, and includes an attachment means adapted for attachment to the means for attachment of the pin tool. In operation, the pin tool is mounted to the spindle for rotation and transverse motion therewith. A drive arrangement is coupled to the spindle for rotating the spindle about the axis. A control arrangement is coupled to the spindle, for controllably causing the spindle to plunge the pin tool into a workpiece, and to translate relative to the workpiece.

BRIEF DESCRIPTION OF THE DRAWINGS

FIGS. 2a, 2b, and 2c are side elevation, top plan, and frontal views of a welding apparatus as described by Gentry;

DESCRIPTION OF THE INVENTION

It has been discovered that the time required for plunging the pin tool to the proper depth may tend to reduce the throughput of a stir-friction welder, especially in those situations in which spot welds, or physically short welds are involved.

Using this invention, the same pressure will result in faster penetration, thus speeding welding, decreasing work time, and increasing productivity. Alternatively, a lower pressure may be used which means that the machine need not be as strong and would be less expensive to make.

Figure 1A:
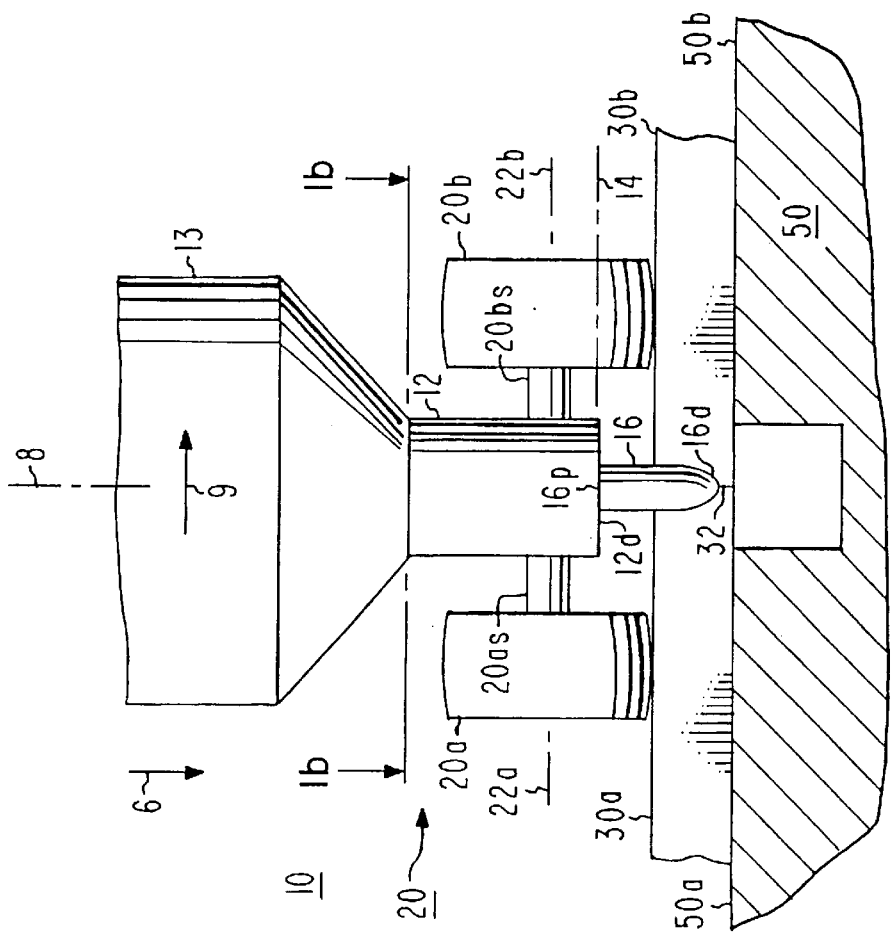
FIG. 1a is a simplified side elevation view of a portion of a welding head and stir-friction welding post or pin in a workpiece, all as described in the abovementioned Gentry patent.
Figure 1C:
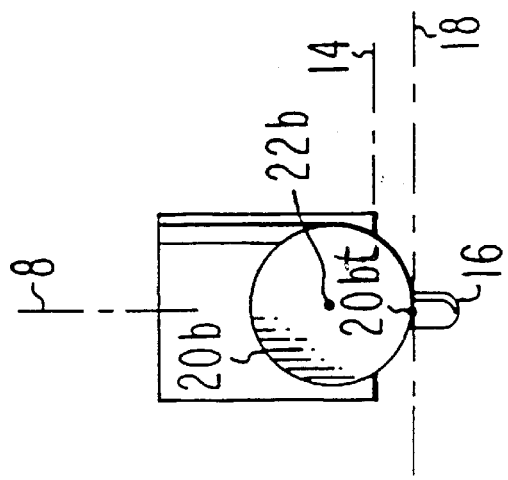
FIG. 1c is a side elevation view of the arrangement of FIG. 1b.
Figure 1B:
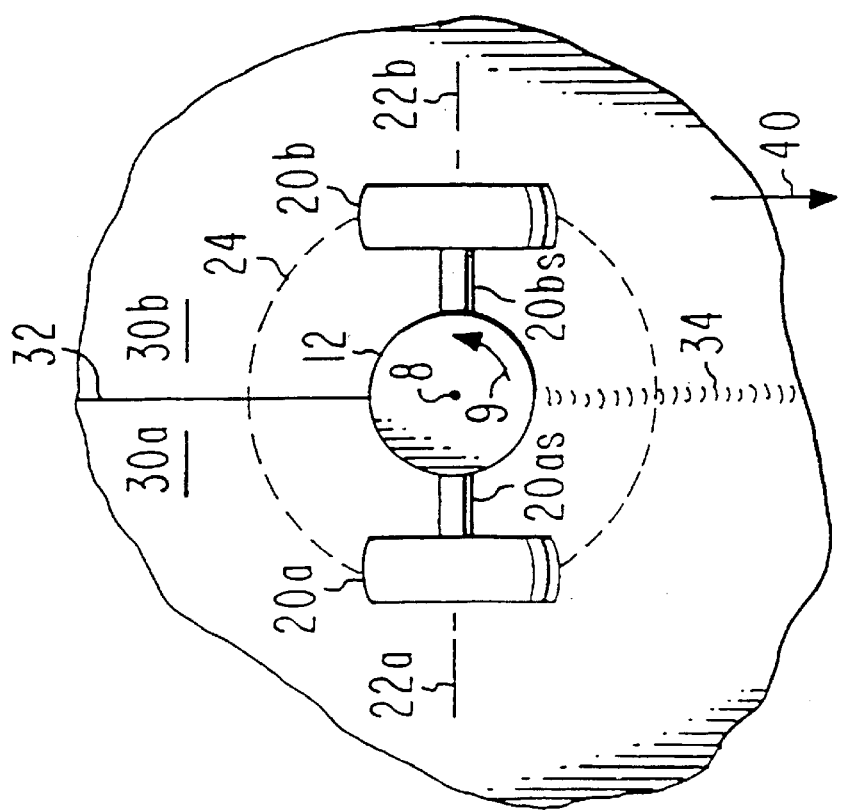
FIG. 1b is a plan view of the arrangement of FIG. 1a looking in the direction of arrows 1b—1b.

In FIGS. 1a, 1b, and 1c, a stir friction welding head 12 as described in the abovementioned Gentry patent is supported by a support element or spindle 13, and rotates about an axis of rotation 8. Welding head 12 has a distal end 12d which is contiguous with a plane 14 which is transverse or orthogonal to axis of rotation 8, and supports the proximal end 16p of a nonconsumable welding post or pin tool 16. Welding post or pin tool 16 also has a free distal end 16d. Welding head 12 may be monolithic with pin tool 16, or they may be coupled together by any other fastening or mechanical coupling arrangement, such as a tapered plug fitting into a tapered aperture as used in industrial drills, or by any of innumerable variations of plug-and-socket arrangements.

A portion of welding post 16 projects past a second plane 18, which is parallel with plane 14, and into the unwelded seam lying between flat portions of mutually adjacent workpieces 30a and 30b, which are supported by a support arrangement or backing bar illustrated as a bipartite arrangement 50 including portions 50a and 50b. Rotation of welding head support or spindle 13 in the direction of arrows 9 causes the welding post 16 to rotate, and to heat the seam region 32 by friction. Those skilled in the art know that relative movement of the workpieces relative to the rotating welding post 16, as suggested by arrow 40 of FIG. 1b, causes the seam region 32 to become a welded region 34.

Various effects can result in welding of the adjacent flat portions 30a, 30b of the workpieces or plates with the upper surfaces not in exactly the same plane. This can occur, for example, if the supports 50 for the workpieces 30a, 30b, or the workpieces themselves, are not completely flat. Movement of the workpieces 30a, 30b relative to each other may occur due to the rotational movement of the welding post 16 in the seam region 32 between the plates 30a, 30b.

If the welding head 12 of FIGS. 1a, 1b, and 1c were to be lowered into contact with the upper surfaces of the workpiece as illustrated in the abovementioned Thomas et al. patent, friction would occur between the distal end 12d of the welding head and portions of the workpieces at some distance from the seam to be welded. This frictional force occurs on a larger radius than that of the welding post, and so the mechanical resistance has a greater lever arm than that of the friction due to the welding post. This larger lever arm results in a greater rotation-retarding torque, which must be overcome by application of a correspondingly larger rotational drive torque. The additional torque requires more drive energy, which is costly. In addition to being costly, the additional energy does not go into the weld region, but rather into the surface of the workpieces at a distance from the seam to be welded, and may score or otherwise deform or deface the surface of the workpieces.

As described in the prior art, the arrangement of FIGS. 1a, 1b, and 1c includes a set 20 of a plurality, illustrated as two, of rollers 20a and 20b, which are supported by, and rotate about, shafts 20as and 20bs, respectively, and about roller rotational axes 22a and 22b. The shafts 20as and 20bs are affixed to the welding head 12 at a location selected so that the rollers are tangent to plane 18, or in other words so that the rollers contact, or are tangent to, the upper surfaces of the workpieces, when the distal end 16d of welding post 16 is at the desired depth of penetration into the seam 32 between the flat portions of the workpieces 30a, 30b. The point of tangency is illustrated as 20bt in FIG. 1c. It will be clear that the centers of the rollers rotate on a circle illustrated as 24 in FIG. 1b in response to rotation 9 of the welding head support or spindle 13 and the welding head 12. Force applied in the direction of arrow 6 of FIG. 1 to the welding head support or spindle 13 and the welding head 12 will tend to drive the rotating welding post 16 deeper into the seam 32 between the flat portions or plates 30a, 30b, until the rollers 20a, 20b contact the upper surfaces of the workpieces. Additional force will not cause any further penetration of the welding post 16 into the seam region 32, although of course unlimited increases of the force, were they to be permitted, might result in breaking some portion of the apparatus or workpiece.

In FIGS. 2a, 2b, and 2c, elements corresponding to those of FIGS. 1a, 1b, and 1c are designated by like reference numerals. In FIGS. 2a, 2b, and 2c, a body 210 supports a motor 214, which drives a gearbox 218. The shaft of gearbox 218 rotationally drives welding head support or spindle 13 by means of a shaft 220. Since the motor 214, gearbox 218, and spindle assembly 224 move as a whole relative to the body 210, there is no need for an adjustable coupling. Welding head support or spindle 13 is carried on an axially movable spindle assembly 224, which is guided by a set 216 of two guide rails 216a, 216b. A hydraulic cylinder 212 is connected at one end to support body 210, and its other end is connected by a joint 212*j* to the spindle assembly 224, for, when pressurized with hydraulic fluid, tending to drive the spindle assembly, and the rotating welding head support or spindle 13, to the left as illustrated in FIG. 2*a*, which corresponds to a direction toward the workpieces in FIGS. 1*a*, 1*b*, and 1*c*. In one of Gentry's embodiments, the rollers are in the form of cam followers with crowned roller surfaces, which tend to reduce scraping of the upper surfaces of the workpieces than would rollers with flat cross-sectional rolling surfaces.

Figure 3:
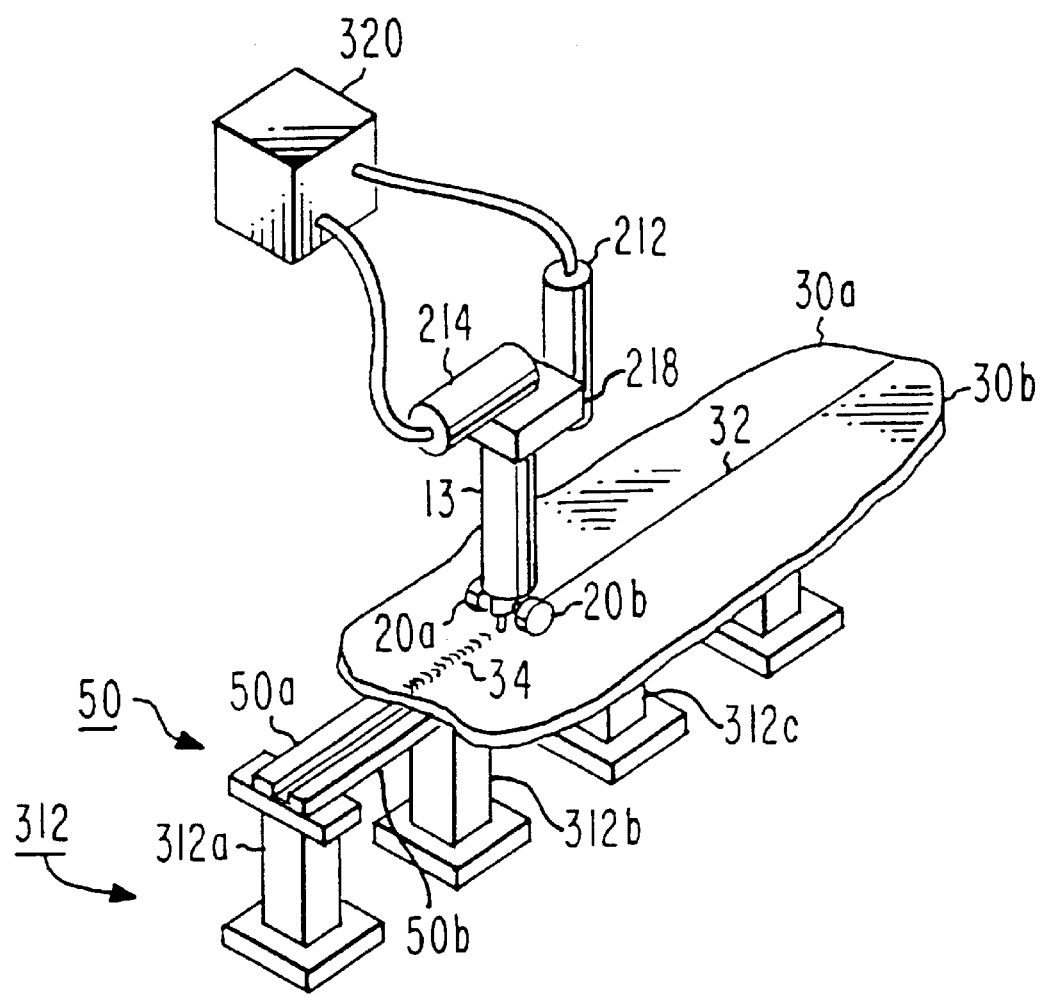
FIG. 3 is a simplified perspective or isometric view of a workpiece supported on a backing bar, being welded by the apparatus of FIGS. 1a, 1b, 1c, 2a, 2b, and 2c in conjunction with a source of constant pressure.

FIG. 3 illustrates the workpieces 30*a* and 30*b* mounted on bipartite backing plate 50, which in turn is supported at locations along its length by a support 312 in the form of plural columns 312*a*, 312*b*, 312*c*, . . . The welding head support or spindle 13, rollers 20*a* and 20*b*, gearbox 218, motor 214, and hydraulic cylinder 212 are also illustrated. A block illustrated as 320 represents a source of electrical energy for driving motor 214, and also represents a source of constant hydraulic pressure, which is applied to hydraulic cylinder 212 during operation to provide a constant force exceeding that required to drive the rotating welding post (not visible in FIG. 3) into the seam region 32 between the plates of the workpiece 30*a*, 30*b*. In operation of the described arrangement, force is applied to the welding head to tend to move it toward the workpiece, and the welding head is rotated, which also rotates the welding post. Since the applied force exceeds that required to cause the welding post to penetrate the seam, the rotating welding post will eventually enter or plunge into the seam region, and welding will begin. The force is maintained, and the rotation continued, until the welding post has plunged to a depth which brings the rollers into contact with the upper surfaces of the workpieces being joined. The rollers react the difference between the applied downward force and upward reaction at the welding post, and the rollers therefore track the surface, and clamp the workpieces against the backing bar 50*a*, 50*b*. Relative motion is then begun between the workpieces and the welding post, as by moving one or the other in the direction of the seam. As the welding post moves along the seam 32 to create the weld 34, the backing bar may deflect away from the welding head in the region between the support columns 312*a*, 312*b*, 312*c*, . . . The deflection of the backing bar tends to cause the work to move away from the welding head, and therefore tends to affect the depth of penetration of the welding post. The regulation of the force applied to the welding head by means of the constant pressure applied to the hydraulic cylinder tends to maintain the welding head at a constant distance from the upper surface of the workpieces notwithstanding deflection of the underlying support as the weld moves along the seam, and therefore tends to maintain constant penetration of the welding post.

Figure 4A:
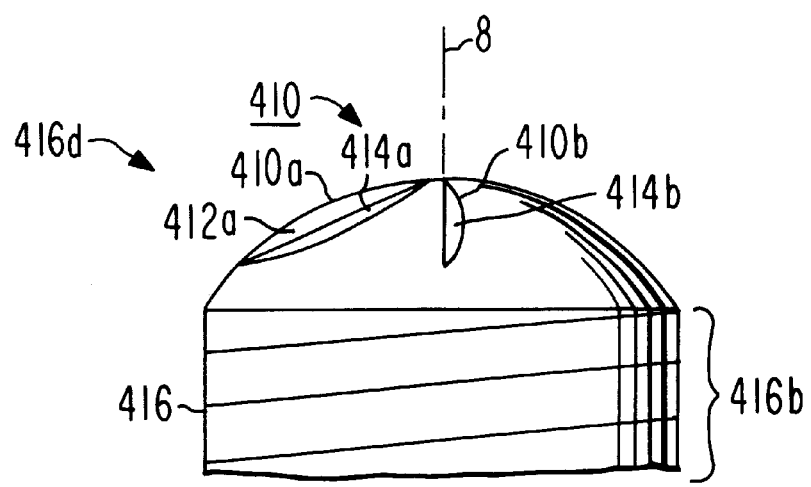
FIGS. 4a, and 4b are side elevation and distal end views, respectively, of a portion of a pin tool including distal slots accordance with an aspect of the invention.
Figure 4B:
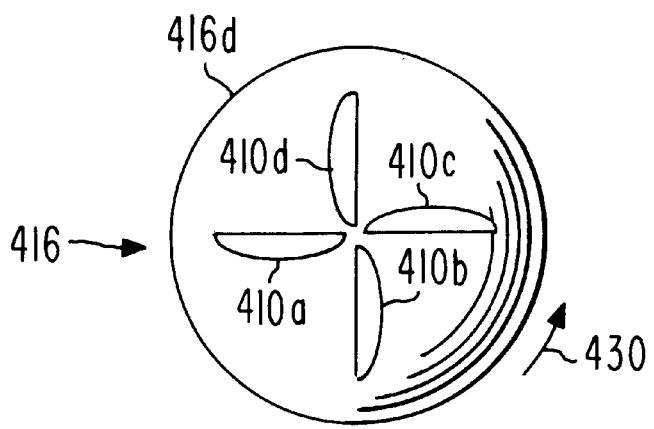
Figure 4C:
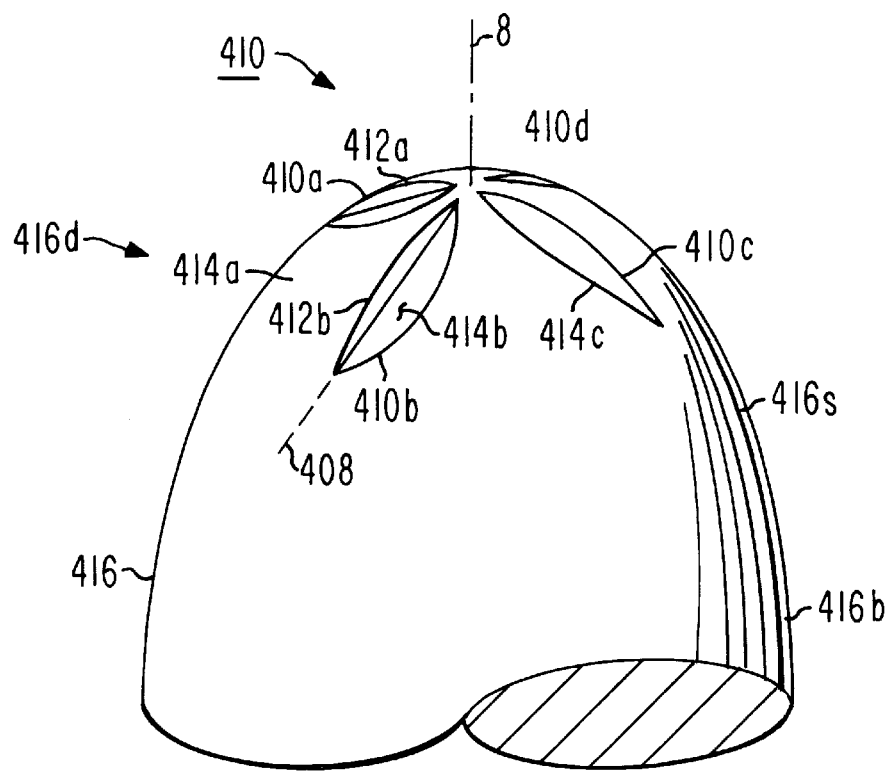
FIG. 4c is a perspective or isometric view of the distal end an a portion of the body of the pin tool of FIGS. 4a and 4b.
Figure 4D:
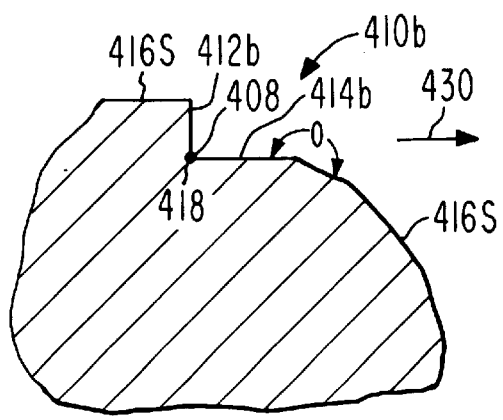
FIG. 4d is a cross-sectional view of a distal slot of FIGS. 4a and 4b.

According to an aspect of the invention, the roughness or friction-causing surface morphology of the distal end or tip of the pin tool is increased, in order to increase the heat generation during plunging of the pin tool into the workpiece or workpiece gap. FIGS. 4*a*, 4*b*, and 4*c* represent the distal end 416*d* of a pin tool 416 according to an aspect of the invention. The outer surface of pin tool 416 is designated 416*s*. As illustrated in FIGS. 4*a*, 4*b*, and 4*c*, a set 410 including a plurality of radial slots 410*a*, 410*b*, 410*c*, and 410*d* extend approximately radially away from the axis 8 of the pin tool 416. As illustrated, the number of radial slots in set 410 is four. Each slot of set 410 includes two surfaces, namely a surface 412 and a surface 414. Thus, slot 410*a* includes straight surfaces 412*a* and 414*a*, and slot 410*b* includes straight sides 412*b* an d414*b*. Only side 414*c* of slot 410*c* is visible in FIG. 4*c*. FIG. 4*d* is a cross-sectional view of one slot, selected as slot 410*b* for illustration, showing its straight sides 412*b* and 414*c*. Straight side 412*b* makes a right angle with straight side 414*b* at a juncture 418. Straight slot surface 412*b* makes a right angle with pin tool outer surface 416*s*, while straight slot surface 414*b* makes an obtuse angle 0 with surface 416*s*. As the pin tool rotates in the direction indicated by arrow 430 in FIG. 4*b*, the straight sides 412 of each slot of set 410 tend to slightly shave or at least distort the material of the workpiece. Unlike a drill bit, the slots in the distal end of the pin tool do not tend to move any shaved material away from the tool, so any shaved material tends to stay in the locale, and is melded or blended in a heat-generating manner. This increased heat generation results from the increase in torque transferred to the drive spindle 13 from the pin tool 416 during rotation. Experimental results comparing a tool according to FIGS. 4*a*, 4*b*, 4*c*, and 4*d* with a corresponding tool not having radial slots indicates that heat is generated more quickly, with the result that plunging of the tool is more rapid.

Figure 7:
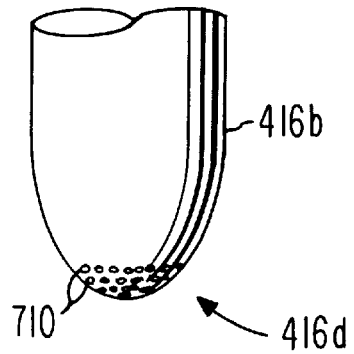
FIG. 7 is a representation of the distal end of a pin tool into which holes are drilled to roughen the surface.

Instead of cutting slots into the tip portion of the pin tool, holes, some of which are illustrated as 710 in FIG. 7, could be drilled therein. In FIG. 7, the holes can be drilled either axially or perpendicular to the local surface; their depth is not particularly important.

Figure 5:
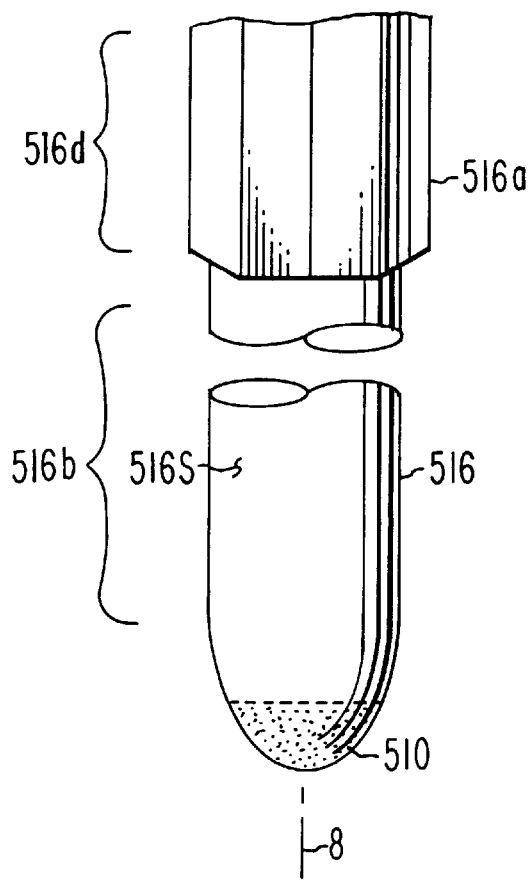
FIG. 5 is a representation of a portion of a pin tool according to another aspect of the invention in which the distal end is roughened.

According to another aspect of the invention, a pin tool has its distal portion roughened by etching, rather than by slotting. Such a tool has a distal portion with a surface roughness which is greater than the surface roughness of the cylindrical body portion of the pin tool. In FIG. 5, the pin tool 516 is illustrated as including a generally cylindrical body portion 516*b* defining an axis 8, a proximal portion 516*d* which includes a hexagonal attachment 516*a*, and a distal portion 510. Distal portion 510 includes a portion illustrated as dotted, which represents a portion which has been roughened, as for example by etching. Such an arrangement tends to produce more heat during plunging than a conventional smooth tip, and should have the same effect as the slots of the embodiment of FIGS. 4*a*, 4*b*, 4*c*, and 4*d*. Such a roughened surface could be made in other ways, as by forming the distal end of the pin tool from a matrix with hard inclusions, or inclusions resistant to corrosion, followed by an etching step.

Figure 6:
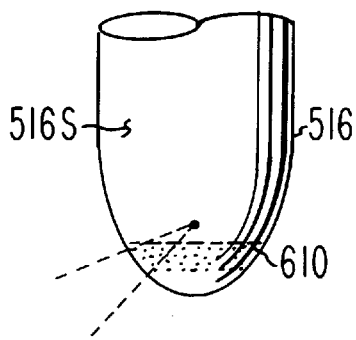
FIG. 6 is a representation of a portion of a pin tool near the distal end, showing roughness at least equal to 128 microinches over at least a portion of the tip region.

It will be appreciated that surface roughness precisely on the axis of rotation of the pin tool may not contribute to the generation of as much heat as locations farther from the axis, due to the relatively small amount of motion of axial portions relative to regions remote from the axis. In other words, roughness does no good unless there is relative motion of the rough portion of the pin tool relative to the workpiece. It may be that, for some applications, a portion of the tip of the pin tool which is less than the entire tip may be roughened, and provide adequate plunging or penetration even though less than the maximum possible. Thus, an annular roughened tip region, such as region 610 of FIG. 6, may be sufficient for some applications.

According to another aspect of the invention, the distal end of the pin tool (510 of FIG. 5) has a surface roughness of 128 RMS microinches ($\mu$") or greater, regardless of the roughness of the cylindrical portion 516S of the pin tool.

Other embodiments of the invention will be apparent to those skilled in the art. For example, any type of surface configuration, treatment or coating which tends to increase friction can be used in accordance with the invention, and not just those particular configurations or treatments illustrated. In particular, a surface coating could be applied to the distal end of the pin tool by sputtering or other deposition techniques, to provide a roughened outer surface. Those familiar with the results of hot-dip galvanizing will realize that similar techniques might be used to generate a roughened surface (although the hardness of zinc might not be useful for the heating or welding of any but the softest materials, and other materials might have to be applied to the tool). Even a surface contour having a roughly sinusoidal contour should be an improvement over a smooth contour, since rotation of the tool with such a distal contour should alternately compress and release the underlying material in such a fashion as to generate heat.

Thus, a method for stir friction welding according to an aspect of the invention includes the step of procuring a stir friction pin tool (416;516) having the general form of an elongated cylindrical body (416b; 516b) defining a distal end (416d;510), and also having a predetermined surface roughness about the cylindrical body (416b; 516b), and a greater surface roughness at the distal end (416d;510). The method includes the step of rotating the pin tool (416;516) while plunging the distal end (416d;510) of the pin tool (416;516) into a workpiece (30a, 30b) for friction welding of the workpiece (30a, 30b). The method further includes the translation of the pin tool (416;516) transversely along, or relative to, the workpiece (30a, 30b) without significant further plunging to continue the stir friction welding of the workpiece (30a, 30b). The procuring step may involve procuring a pin tool (416;516) having one or more slots (set 410) cut into the distal end (416d;510), or it may involve procuring a pin tool (416;516) in which the distal end (416d;510) is roughened (FIG. 5), as by etching with acid. One version of the method uses a pin tool in which at least a portion (610) of the tip region has a surface roughness of 128 microinches or greater, regardless of the roughness of the cylindrical portion of the pin tool.

A method according to another aspect of the invention includes the step of procuring a stir friction pin tool (416;516) having the general form of an elongated cylindrical body (416b; 516b) defining an axis (8) and a generally rounded distal end (416d;510), and also including at least one slot extending radially away from the axis (8) along a portion of the rounded distal end (416d;510). The method includes the rotation of the pin tool (416;516) while plunging the distal end (416d;510) of the pin tool (416;516) into a workpiece (30a, 30b) for friction welding thereof, and also the translation of the pin tool (416;516) transversely along the workpiece (30a, 30b) without significant further plunging to continue the stir friction welding of the workpiece (30a, 30b).

In one mode of the method according to this other aspect of the invention, the procuring step includes the step of procuring a stir friction pin tool (416;516) having the general form of an elongated cylindrical body (416b; 516b) defining an axis (8) and a generally rounded distal end (416d;510), and in which the pin tool (416;516) also includes at least one elongated slot (410a) extending radially away from the axis (8) along a portion of the rounded distal end (416d;510). Each such slot includes a first surface (412a, 412b, 412c, 412d) which, in any cross-section transverse to the axis (408) of elongation thereof, is orthogonal to the surface (416s) of the distal end (416d;510), and also includes a second surface (414a, 414b, 414c, 414d), orthogonal to the first surface (412a, 412b, 412c, 412d) of the slot, which makes an obtuse angle (O) with the exterior surface (416s) of the distal end (416d;510).

A stir friction welding apparatus according to a further aspect of the invention includes a stir friction pin tool (416;516) defining a cylindrical body (416b; 516b), a distal end (416d;510) and a proximal end (16p). The pin tool (416;516) has a given surface roughness about the periphery of the cylindrical body (416b; 516b), and attachment means (16p, 516d) adjacent the proximal end (16p). The pin tool (416;516) according to this further aspect of the invention includes a surface roughness on the distal end (416d;510) which is greater than the given surface roughness. The apparatus further includes a spindle (12) defining an axis (8) and adapted for rotation thereabout, and also adapted for relative axial and transverse motion relative to a workpiece (30a, 30b). The spindle includes attachment means adapted for attachment to the attachment means of the pin tool (416;516), and is so attached. A drive arrangement (10) is coupled to the spindle 912) for rotating the spindle about the axis (8). A control (320) is coupled BY WAY OF 212, 214, 218, 13) to the spindle (12), for controllably causing the spindle (12) to plunge the pin tool (416;516) into a workpiece (30a, 30b), and to translate the spindle relative to the workpiece (30a, 30b).

What is claimed is:

1. A method for stir friction welding, comprising the steps of:

procuring a stir friction pin tool having the general form of an elongated cylindrical body defining a distal end, said pin tool having a predetermined surface roughness about said cylindrical body, and a greater surface roughness at said distal end;

rotating said pin tool while plunging said distal end and at least a portion of said cylindrical body of said pin tool into a workpiece for friction welding thereof; and translating said pin tool transversely along said workpiece without significant further plunging to continue said stir friction welding of said workpiece.

2. A method for stir friction welding, comprising the steps of:

procuring a stir friction pin tool having the general form of an elongated cylindrical body defining a distal end, said body of said pin tool having a smooth surface, and said distal end having an RMS surface roughness no less than 128 microinches at said distal end;

rotating said pin tool while plunging said distal end of said pin tool into a workpiece to a depth sufficient to bring at least a portion of said cylindrical body into contact with the material of said workpiece for friction welding thereof; and translating said pin tool transversely along said workpiece without significant further plunging to continue said stir friction welding of said workpiece.

3. A method for stir friction welding, comprising the steps of:

procuring a stir friction pin tool having the general form of an elongated cylindrical body defining a distal end, said pin tool having a surface contour at said distal end equivalent to an RMS roughness no less than 128 microinches, said cylindrical body being less rough in regions removed from said distal end;

rotating said pin tool while plunging said distal end of said pin tool into a workpiece to a depth sufficient to bring said cylindrical body into contact with the material of said workpiece for friction welding thereof; and translating said pin tool transversely along said workpiece without significant further plunging to continue said stir friction welding of said workpiece.

4. A method for stir friction welding, comprising the steps of:
- procuring a stir friction pin tool having the general form of an elongated cylindrical body defining an axis and a generally rounded distal end, said pin tool also including at least one slot extending radially away from said axis along a portion of said rounded distal end, which slot does not extend onto said cylindrical body;
- rotating said pin tool while plunging said distal end of said pin tool into a workpiece to a depth sufficient to bring said cylindrical body into contact with the material of said workpiece for friction welding thereof; and
- translating said pin tool transversely along said workpiece without significant further plunging to continue said stir friction welding of said workpiece.

5. A method for stir friction welding, comprising the steps of:
- procuring a stir friction pin tool having the general form of an elongated cylindrical body defining a distal end, said pin tool having an RMS surface roughness no less than 128 microinches at said distal end;
- rotating said pin tool while plunging said distal end of said pin tool into a workpiece for friction welding thereof; and
- translating said pin tool transversely along said workpiece without significant further plunging to continue said stir friction welding of said workpiece; wherein
- said procuring step includes the step of procuring a stir friction pin tool having the general form of an elongated cylindrical body defining an axis and a generally rounded distal end, said pin tool also including at least one elongated slot extending radially away from said axis along a portion of said rounded distal end, which slot includes a first surface which, in any cross-section transverse to the axis of elongation thereof, is orthogonal to the surface of said distal end, and which slot also includes a second surface, orthogonal to said first surface of said slot, which makes an obtuse angle with said surface of said surface of said distal end.

6. A stir friction welding apparatus, comprising:
- a stir friction pin tool defining a cylindrical body, a distal end and a proximal end, said pin tool having a given surface roughness about the periphery of said cylindrical body, attachment means adjacent said proximal end, and a surface roughness on said distal end which is greater than said given surface roughness;
- a spindle defining an axis and adapted for rotation thereabout, and also adapted for relative axial and transverse motion relative to a workpiece, said spindle including attachment means adapted for attachment to said attachment means of said pin tool and so attached;
- drive means coupled to said spindle for rotating said spindle about said axis; and
- control means coupled to said spindle, for controllably causing said spindle to plunge said pin tool into a workpiece, and to translate said spindle relative to said workpiece.

* * * * *